United States Patent
Walters et al.

(10) Patent No.: US 10,628,638 B1
(45) Date of Patent: Apr. 21, 2020

(54) TECHNIQUES TO AUTOMATICALLY DETECT FRAUD DEVICES

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/361,265

(22) Filed: Mar. 22, 2019

(51) Int. Cl.
*G06K 7/00* (2006.01)
*G06Q 20/40* (2012.01)
*G06K 7/10* (2006.01)
*G06K 7/08* (2006.01)

(52) U.S. Cl.
CPC ......... *G06K 7/0091* (2013.01); *G06K 7/0095* (2013.01); *G06K 7/08* (2013.01); *G06K 7/10564* (2013.01); *G06Q 20/4016* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,571,489 A | * | 2/1986 | Watanabe | B65H 29/60 235/379 |
| 4,587,408 A | * | 5/1986 | Watanabe | B65H 29/40 235/379 |
| 5,912,619 A | | 6/1999 | Vogt | |
| 7,143,934 B2 | * | 12/2006 | Ghisani | G06K 13/067 235/379 |
| 7,483,848 B2 | * | 1/2009 | Enright | G06Q 20/18 382/312 |
| 7,494,053 B1 | | 2/2009 | Burns | |
| 7,995,791 B2 | * | 8/2011 | Flook | G06T 7/001 340/568.1 |
| 8,953,045 B2 | * | 2/2015 | Priesterjahn | G07F 19/20 235/379 |
| 9,449,561 B1 | * | 9/2016 | Umansky | G09G 5/003 |
| 9,863,767 B2 | | 1/2018 | Fuchikami et al. | |
| 10,262,326 B1 | * | 4/2019 | Yaqub | G06Q 30/0185 |
| 10,296,907 B1 | * | 5/2019 | Nolte | G06F 1/00 |
| 2001/0010333 A1 | * | 8/2001 | Han | G06K 19/045 235/454 |
| 2003/0006098 A1 | * | 1/2003 | Wike, Jr. | A47F 9/046 186/61 |
| 2004/0129773 A1 | | 7/2004 | Lute, Jr. et al. | |
| 2004/0129774 A1 | | 7/2004 | Utz et al. | |
| 2004/0173671 A1 | | 9/2004 | Ferraro | |
| 2004/0212142 A1 | | 10/2004 | Graef et al. | |
| 2004/0222286 A1 | * | 11/2004 | Douglass | G06Q 20/1085 235/381 |

(Continued)

FOREIGN PATENT DOCUMENTS

JP 2008027259 A * 2/2008
JP 2016184283 A * 10/2016

*Primary Examiner* — Daniel I Walsh

(57) ABSTRACT

Various embodiments are generally directed to techniques detect transaction card skimmers based on emitted and detected light patterns. Embodiments may also include techniques to detect transaction card skimmers based on detected ambient light levels.

17 Claims, 16 Drawing Sheets

(56) References Cited

U.S. PATENT DOCUMENTS

| | | | |
|---|---|---|---|
| 2005/0023356 A1* | 2/2005 | Wiklof | G06K 7/10564 |
| | | | 235/462.42 |
| 2006/0226215 A1* | 10/2006 | Yu | G07F 19/20 |
| | | | 235/379 |
| 2007/0080215 A1 | 4/2007 | Ramachandran et al. | |
| 2007/0080225 A1* | 4/2007 | Hirasawa | G06K 7/08 |
| | | | 235/449 |
| 2007/0200928 A1* | 8/2007 | O'Doherty | G07F 19/20 |
| | | | 348/143 |
| 2007/0284440 A1* | 12/2007 | Birmingham | G06Q 10/087 |
| | | | 235/383 |
| 2009/0026966 A1 | 1/2009 | Budde et al. | |
| 2010/0059589 A1* | 3/2010 | Goncalves | G06K 9/00771 |
| | | | 235/383 |
| 2010/0066821 A1 | 3/2010 | Rosener et al. | |
| 2010/0204960 A1 | 8/2010 | Hagadone et al. | |
| 2013/0119136 A1* | 5/2013 | Ishikawa | G07F 19/2055 |
| | | | 235/449 |
| 2014/0158768 A1 | 6/2014 | Ray et al. | |
| 2014/0184071 A1 | 7/2014 | Peck et al. | |
| 2014/0372305 A1 | 12/2014 | Ray et al. | |
| 2015/0263861 A1 | 9/2015 | Kumar et al. | |
| 2015/0302707 A1* | 10/2015 | Wiesinger | G07F 19/2055 |
| | | | 235/440 |
| 2017/0372144 A1* | 12/2017 | Kurita | G08B 13/196 |
| 2018/0158040 A1* | 6/2018 | Pavageau | G06Q 20/20 |
| 2019/0026997 A1* | 1/2019 | Astigarraga | G06F 21/82 |
| 2019/0130240 A1* | 5/2019 | Scaife | G06K 19/07309 |

* cited by examiner

600

```
CAUSE THE LIGHT SOURCE TO EMIT A RANDOM LIGHT
PATTERN
605
            │
RECEIVE INFORMATION FROM THE LIGHT DETECTOR, THE
INFORMATION INDICATING A RECEIVED LIGHT PATTERN
610
            │
DETERMINE WHETHER THE RECEIVED LIGHT PATTERN
MATCHES THE RANDOM LIGHT PATTERN
615
            │
IN RESPONSE TO THE DETERMINATION THAT THE RECEIVED
LIGHT PATTERN DOES NOT MATCH THE RANDOM LIGHT
PATTERN, CAUSE A REMEDIAL ACTION TO BE PERFORMED
620
            │
IN RESPONSE TO THE DETERMINATION THAT THE RECEIVED
LIGHT PATTERN DOES MATCH THE RANDOM LIGHT
PATTERN, EMIT ANOTHER RANDOM LIGHT PATTERN
625
```

CAUSE THE LIGHT SOURCE TO EMIT A RANDOM LIGHT PATTERN
645

RECEIVE INFORMATION FROM EACH OF THE PLURALITY OF LIGHT DETECTORS, THE INFORMATION INDICATING RECEIVED LIGHT PATTERNS FROM EACH OF THE PLURALITY OF LIGHT DETECTORS
650

DETERMINE WHETHER THE RECEIVED LIGHT PATTERNS MATCH THE RANDOM LIGHT PATTERN
655

IN RESPONSE TO THE DETERMINATION THAT AT LEAST ONE OF THE RECEIVED LIGHT PATTERNS DO NOT MATCH THE RANDOM LIGHT PATTERN, CAUSE A REMEDIAL ACTION TO BE PERFORMED
660

IN RESPONSE TO THE DETERMINATION THAT THE RECEIVED LIGHT PATTERNS DO MATCH THE RANDOM LIGHT PATTERN, PERMIT A TRANSACTION SYSTEM TO PROCESS DATA
665

CAUSE A LIGHT SOURCE EMBEDDED IN A TRANSACTION SYSTEM TO EMIT A RANDOM LIGHT PATTERN
675

RECEIVE INFORMATION FROM AT LEAST ONE OF A PLURALITY OF LIGHT DETECTORS, THE INFORMATION INDICATING ONE OR MORE RECEIVED LIGHT PATTERNS FROM THE AT LEAST ONE OF THE PLURALITY OF LIGHT DETECTORS, AND AT LEAST ONE OF THE PLURALITY OF LIGHT DETECTORS EMBEDDED IN A HOUSING OF THE TRANSACTION SYSTEM, A TRANSACTION CARD READER OF THE TRANSACTION SYSTEM, AND A PIN PAD OF THE TRANSACTION SYSTEM
680

DETERMINE WHETHER THE ONE OR MORE RECEIVED LIGHT PATTERNS DETECTORS MATCH THE RANDOM LIGHT PATTERN
685

IN RESPONSE TO THE DETERMINATION THAT THE ONE OR MORE RECEIVED LIGHT PATTERNS DO NOT MATCH THE RANDOM LIGHT PATTERN, CAUSE A REMEDIAL ACTION TO BE PERFORMED
690

IN RESPONSE TO THE DETERMINATION THAT THE RECEIVED LIGHT PATTERNS DO MATCH THE RANDOM LIGHT PATTERN, PERMIT THE TRANSACTION SYSTEM TO PROCESS DATA
695

RECEIVE INFORMATION FROM EACH OF THE PLURALITY OF LIGHT DETECTORS, THE INFORMATION INDICATING RECEIVED AMBIENT LIGHT LEVELS
705

DETERMINE WHETHER EACH OF THE RECEIVED AMBIENT LIGHT LEVELS IS EQUAL TO OR IS BELOW AN AMBIENT LIGHT THRESHOLD VALUE
710

IN RESPONSE TO THE DETERMINATION THAT AT LEAST ONE OF THE RECEIVED AMBIENT LIGHT LEVELS IS EQUAL TO OR BELOW THE AMBIENT LIGHT THRESHOLD VALUE, CAUSE A REMEDIAL ACTION TO BE PERFORMED
715

IN RESPONSE TO THE DETERMINATION THAT THE RECEIVED AMBIENT LIGHT LEVELS ARE ABOVE THE AMBIENT LIGHT THRESHOLD VALUE, PERMIT A TRANSACTION SYSTEM TO PROCESS TRANSACTION DATA
720

RECEIVE INFORMATION FROM THE LIGHT DETECTOR, THE INFORMATION INDICATING AN AMBIENT LIGHT LEVEL DETECTED BY THE LIGHT DETECTOR
735

DETERMINE WHETHER THE AMBIENT LIGHT LEVEL ABOVE AN AMBIENT LIGHT THRESHOLD VALUE
740

IN RESPONSE TO THE DETERMINATION THAT THE AMBIENT LIGHT LEVEL IS NOT ABOVE THE AMBIENT LIGHT THRESHOLD VALUE, CAUSE A REMEDIAL ACTION TO BE PERFORMED
745

IN RESPONSE TO THE DETERMINATION THAT THE AMBIENT LIGHT LEVEL IS ABOVE THE AMBIENT LIGHT THRESHOLD VALUE, PERMIT A TRANSACTION TO BE PROCESSED
750

TECHNIQUES TO AUTOMATICALLY DETECT FRAUD DEVICES

BACKGROUND

Transaction card skimmers are devices placed on top of actual transaction card readers of transactions systems. The transaction card skimmers are used by fraudsters to steal personal information by reading magnetic strips of transaction cards. These card skimming devices are typically hard to detect and designed to blend in with existing portions of the transaction system, e.g., the card reading device. The card skimmers operate in a manner that is unknown to a customer, and the customer may not know that personal information has been compromised for a long time.

SUMMARY

Various embodiments described herein may include techniques, methods and devices, as disclosed herein, to detect transaction card skimmers based on emitted/detected light patterns. In one example, an apparatus may include a housing of a transaction system, the housing comprising a light detector; a light source capable of emitting light patterns; and a processing circuit coupled with the light source and the light detector. The processing circuit to cause the light source to emit a random light pattern; receive information from the light detector, the information indicating a received light pattern; determine whether the received light pattern matches the random light pattern; in response to the determination that the received light pattern does not match the random light pattern, cause a remedial action to be performed; and in response to the determination that the received light pattern does match the random light pattern, emit another random light pattern.

BRIEF DESCRIPTION OF THE DRAWINGS

FIGS. 6A-6C illustrate examples of processing flows to perform tampering detection based on light patterns.

FIGS. 7A-7C illustrate examples of processing flows to perform tampering detection based on ambient light.

DETAILED DESCRIPTION

Figure 1:
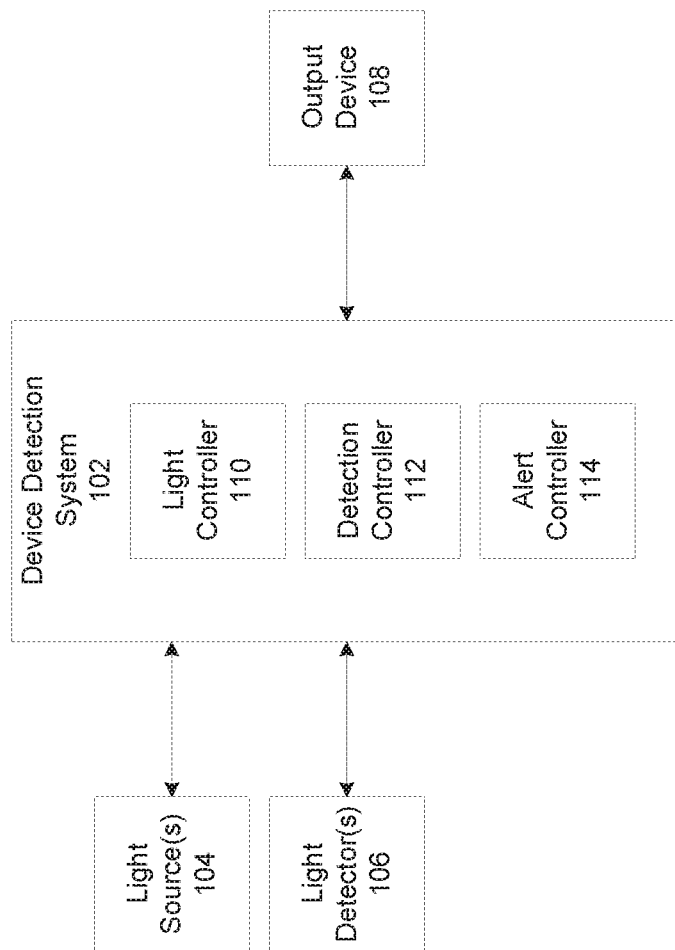
FIG. 1 illustrates an example of a system to process transactions.

Embodiments are generally directed to detecting fraud devices, such as card skimmers, that may be placed on transaction systems, such as ATMs, POS terminals, gas station terminals, and so forth. In one example, a device may include circuitry to cause one or more light sources to emit at least one random light pattern. For example, one or more light sources may be placed strategically on the transaction, e.g., on or near a housing a card reader, and cause by the circuitry to emit random patterns. In embodiments, one or more light detectors may detect the random light patterns. The circuitry may receive information from the light detectors, indicating at least one of the received light patterns. The circuitry may then utilize the received light patterns to determine whether a fraud device may have been placed on the transaction. For example, the circuitry may determine whether the one or more received light pattern matches the one or more emitted random light pattern. Further and in response to the determination that the received light pattern(s) do not match the random light pattern(s), the circuitry may cause a remedial action to be performed. The remedial action may causing an alert, notifying the police, notifying a user, and so forth. In response to the determination that the received light pattern does match the random light pattern, the circuitry may continue to operate and emit additional random light patterns.

In another example, embodiments may include detecting fraud devices based on ambient light levels. For example, embodiments may include circuitry coupled with one or more light detectors. The light detectors may be utilized to detect ambient light levels. In embodiments, the circuitry may receive information from each of the one or more light detectors, the information may indicate received ambient light levels detected by the light detectors. The circuitry may then perform one or more operations to determine whether a fraud device has been placed on the transaction system. For example, the circuitry may determine whether each of the received ambient light levels is equal to or is below an ambient light threshold value. In response to the determination that at least one of the received ambient light levels is equal to or below the ambient light threshold value, the circuitry may cause a remedial action to be performed. Further and in response to the determination that the received ambient light levels are above the ambient light threshold value, the circuitry may permit a transaction system to process transaction data and continue to monitor ambient light levels.

Note that embodiments are not limited to the above-recited examples. In some embodiments, fraud devices may be detected based on a combination of the techniques described above. For example, embodiments may include circuitry to determine whether detected one or more light patterns match emitted light patterns. The circuitry may also process ambient light level information detected by one or more light detectors. The combination of the detected patterns and ambient light levels may be utilized to determine whether fraud devices are placed on the transaction system. Embodiments are not limited in this manner.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a transaction system 100 that is capable of performing operations to process transactions and may include devices, such as automatic teller machines (ATMs), point-of-sale (POS) terminals, payment card readers, etc. In embodiments, the transaction system 100 may include a device detection system 102 to detect fraud devices that may be placed on or near the transaction system 100. These fraud devices may include credit card skimmers, ATM skimmers, gas pump skimmers, or anything device that may be applied to the transaction system 100 to fraudulently read a customers payment card information. The device detection system 102 includes a light controller 110, a detection controller 112, and an alert controller 114. In embodiments, the light controller 110 can be used to control light source(s) 104, the detection controller 112 may process data from the light detector(s) 106, and the alert controller 114 may cause a remedial action via an output device 108. The components of the device detection system 102 may be incorporated in and/or be part of a device, such as an ATM, a POS terminal, payment card reader, and so forth, as will be discussed in more detail below.

The device detection system 102 determines whether a device, such as a payment card skimmer, has been placed on the transaction system 100 to 'skim' or read credit/debit card numbers off the magnetic strip (or through NFC) of a payment card placed into the device. In embodiments, the device detection system 102 including the detection controller 112 may process the information from the light detector(s) 106 to determine if a device is being placed on the transaction system 100. In some embodiments, the detection may be based on ambient light levels detected by the light detector(s) 106 and/or a pattern emitted by the light source(s) 104 and detected by the light detector(s) 106.

For example, the device detection system 102 including the detection controller 112 may receive information from the one or more light detector(s) 106 and process the information to perform a detection. In one example, the information may indicate one or more detected ambient light levels. More specifically, the detection controller 112 can determine or detect an electric current level that is provided by a light detector 106 and determine an ambient light level based on the intensity of the current, e.g., the stronger the current indicates more ambient light and vice versa. In another example, the detection controller 112 can determine or detect a resistance level outputted by a light detector 106 to determine an ambient light level based on the level of resistance, e.g., higher resistance equals a higher level of ambient light, and vice versa. Examples of a light detector 106 may include a photodetector, phototransistor, photodiode, or photonic integrated circuits (photodetector+amplifier) that is used to sense or measure the amount of ambient light or illuminance present. In addition, the light detector(s) 106 are capable of measuring light from a variety of light source(s) 104, e.g., natural sunlight, fluorescent lights, incandescent lights, light emitting diode (LED) lights, etc., which may or may not be controlled by device detection system 102.

In this example, device detection system 102 determine or detect a device if the information from at least one of the light detector(s) 106 indicates the ambient light is below (or equal to) an ambient light threshold value, such as a zero value or another value determined to indicate a physical object is blocking a light detector 106. In some instances, the ambient light threshold value may be preset or predetermined by a user of the device detection system 102. In another example, the device detection system 102 may determine a baseline ambient light level for each of the one or more light detector(s) 106, and the baseline ambient light level may be used as the ambient light threshold value. The baseline ambient light level may be the average ambient light detected over a period of time or determined to utilize machine-learning techniques, for example. In some embodiments, the device detection system 102 may utilize one or more of the light detector(s) to determine the ambient light level and use that value as the ambient light threshold value. For example, the transaction detection system 102 may include a light detector 106 placed in such a location that it would not be blocked by a device, and utilizing the reading from that light detector 106 as the ambient light threshold level. In some instances, the ambient light threshold value may be a current level or a resistance level based on the information provided by the light detector(s) 106. Embodiments are not limited in this manner.

In embodiments, the device detection system 102 including the detection controller 112 may detect a device based on a change in ambient light indicated by one or more light detector(s) 106. For example, a decrease in ambient light detected may indicate that an object is covering or obstructing a light detector 106. In some instances, the triggering event may be when the detection controller 112 determines that the ambient light level has decreased for all of the light detectors 106 of the transaction system 100. In other instances, the trigger event may be when the detection controller 112 determines that only a subset of a plurality of light detector(s) 106 indicated a decrease in ambient light level. In this example, having only a subset of the plurality light detectors 106 detect a decrease in ambient light level may indicate that the actual ambient light level did not change, and an object is blocking or obstructing the subset of the light detectors 106.

In some embodiments, the device detection system 102 may utilize one or more light source(s) 104 to emit a pattern and perform device detection based on a received pattern not matching the emitted pattern. More specifically, the device detection system 102 including the light controller 110 may control the output of one or more light source(s) 104 such that they emit distinctive patterns. The light controller 110 may generate a pattern or light sequence that may be random or non-random. The light source(s) 104 may emit light based on the pattern received from the light controller 110. Note that the light source(s) 104 may emit light in a particular light range, e.g., the visible light spectrum (electromagnetic radiation in the 390-700 nanometers (nm) range), infrared spectrum (700 nm-1 millimeter (mm), and/or ultraviolet spectrum (10 nm-400 nm). For example, the transaction system 100 may utilize light source(s) 104 that emit in the infrared spectrum that is not visible to the human eye. Thus, an emitted pattern will not bother or be irritant to people near the light source(s) 104. In this example, the light detector(s) 106 may be specifically chosen and utilized such that they are capable of detecting the emitted light, e.g., in the infrared spectrum. The light detector (s) 106 may indicate the pattern by changes in current and/or resistance caused by detected light. The detection controller 112 may process the information from the light detector(s) 106 and determine whether the detected light pattern matches the emitted light pattern.

In embodiments, the light controller 110 may cause different patterns to be emitted by the different light source(s) 104. Thus, one light source 104 may emit a first pattern, and another light source 104 may emit a second light pattern. In this example, different light detectors 106 may be able to detect the different light patterns. More specifically, a first detector 106 may be located in such a place to detect the first light pattern and a second detector 106 may be located in such a place to detect the second light pattern, but not the first light pattern. Each of the light detectors 106 may provide their respective detected patterns to the detection controller 112, which may determine whether there is tampering based on the different received patterns. The detection controller 112 may compare the known emitted first pattern with the information received from the first detector 106 and perform a similar operation with the information from the second detector 106 to determine if the detected patterns from each of the detector(s) 106 match their respective known patterns. If one or more of the patterns do not match their expected pattern, the detection controller 112 may cause a remedial action. Note that embodiments are not limited to a particular number of the light source(s) 104 and a corresponding light detector(s) 106. Also, note that one of more of the light detector(s) 106 may not be limited to detecting a single particular pattern but may detect two or more patterns and the detection controller 112 may ensure that the light detector 106 detects each pattern that it is supposed to detect.

The device detection system 102 including the detection controller 110 may determine to cause a remedial action in response to the determination that a device is detected. More specifically, the detection controller 110 may send a signal or indication to the alert controller 114 to cause a remedial action. In embodiments, the alert controller 114 may receive the indication or signal from the detection controller 110 and perform a remedial action, e.g., such as sending an alert, prohibiting a transaction, and/or generating an alarm (audible and/or visual). For example, the alert controller 114 may send information to a bank, an emergency service system (police station), an owner/operator of the payment device, a user of the payment device, etc. to indicate that a transaction system 100 may have been tampered with by a fraudster. The alert may include information about the detection, e.g., location of the payment device, time of detection, account information associated with one or more users, etc. In another example, the alert controller 114 may prevent or prohibit a transaction. In a third example, the alert controller 114 may cause one or more of an audible alarm via a speaker (not shown) and/or a visual alarm via a display (not shown). The alarm may be used to indicate to others that the transaction system 100 has been and/or is being tampered with by the fraudster. In some instances, the remedial action may be an application programming interface (API) call or message to one or more systems to cause one or more actions discussed above, e.g., emergency service system, a system to cause a text and/or multimedia message, a system to cause an audible and/or a visual alert, and so forth. Embodiments are not limited in this manner, and other remedial actions may be performed, e.g., cause spraying of an ink/identifying substance, taking a picture of the fraudster (or vehicle), recording audio, etc.

The number and arrangement of components shown in FIG. 1 is provided as an example. In practice, the system 100 may include additional components, fewer components, different components, or differently arranged components than those shown in FIG. 1. Additionally, or alternatively, a set of components (e.g., one or more components) of system 100 may perform one or more functions described as being performed by another set of components of system 100 and embodiments are not limited in this manner.

The following processing flow diagrams illustrate one or more operations that may be performed by the components of the device detection system 102, such as the light controller 110, the detection controller 112, and the alert controller 114.

Figure 2:
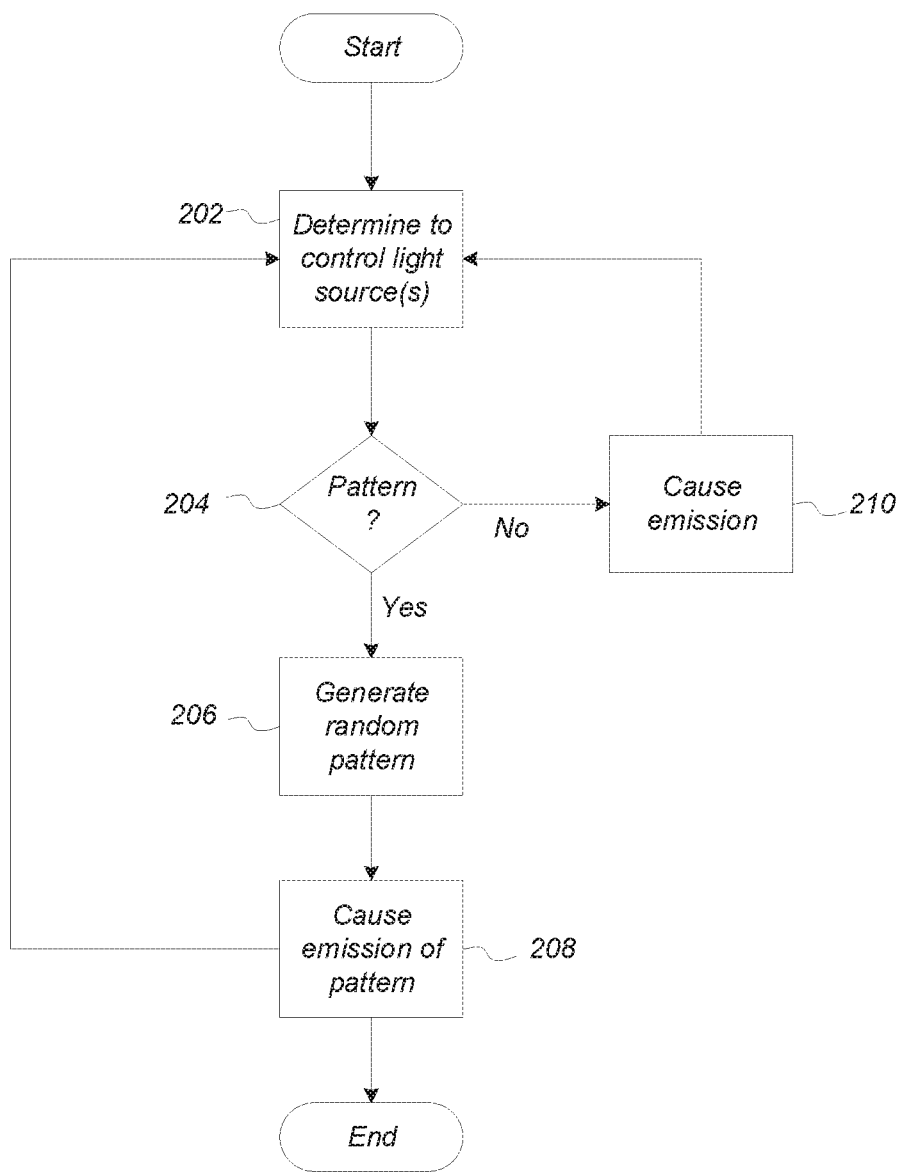
FIG. 2 illustrates an example of a processing flow to control light source(s).

FIG. 2 illustrates an example processing flow 200 to control the output of one or more light sources. In some implementations, one or more processing blocks of FIG. 2 may be performed by the device detection system 102 including the light controller 110. However, embodiments are not limited in this manner.

In embodiments, the processing flow 200 may include determining to control one or more light sources at block 202. For example, the device detection system 102 may determine that one or more light source(s) are coupled with the system and are controllable, e.g., can emit light patterns. Further and at block 204, the processing flow 200 includes determining whether to cause emission of a randomly generated pattern for one or more of the light sources. If at block 204, the device detection system 102 determines not to cause an emission of a random pattern, the processing flow 200 includes causing emission of a constant emission for the one or more light source 210. In other words, the light source may emit light in a constant manner such that no pattern is emitted. In some instances, this state of operation may be desirable over causing a random pattern, e.g., when the light source is emitting visible light.

If at block 204, the device detection system 102 determines to cause an emission of a random pattern, the processing flow 200 includes generating the random pattern at block 206. The random pattern may be based on a random seed value and may be random over a period of time, e.g., 10 milliseconds, 1 second, 5 seconds, etc. In some embodiments, the random pattern may be an error correction code, such as utilizing a parity bit, a linear error-correct code, hamming code, etc. In another example, the random pattern or signal emitted may be based on the intensity of light. At block 208, the processing flow 200 includes causing the emission of the random pattern, e.g., sending information and/or signals to one or more of the light sources to cause the output of the pattern. Note that the processing flow 200 may be operated any number of times, and each instance a different random pattern may be generated. Moreover, the processing flow 200 may operate multiple times for each of a plurality of light sources. In other words, the device detection system 102 may generate separate and distinct random patterns for light sources that may be emitted simultaneously. Embodiments are not limited in this manner.

In embodiments, the processing flow 200 may also be repeated any number of times. In some examples, the device detection system 102 may operate and cause processing flow 200 to repeat on periodic, semi-period, and/or non-periodic basis. Embodiments are not limited in this manner.

Figure 3B:
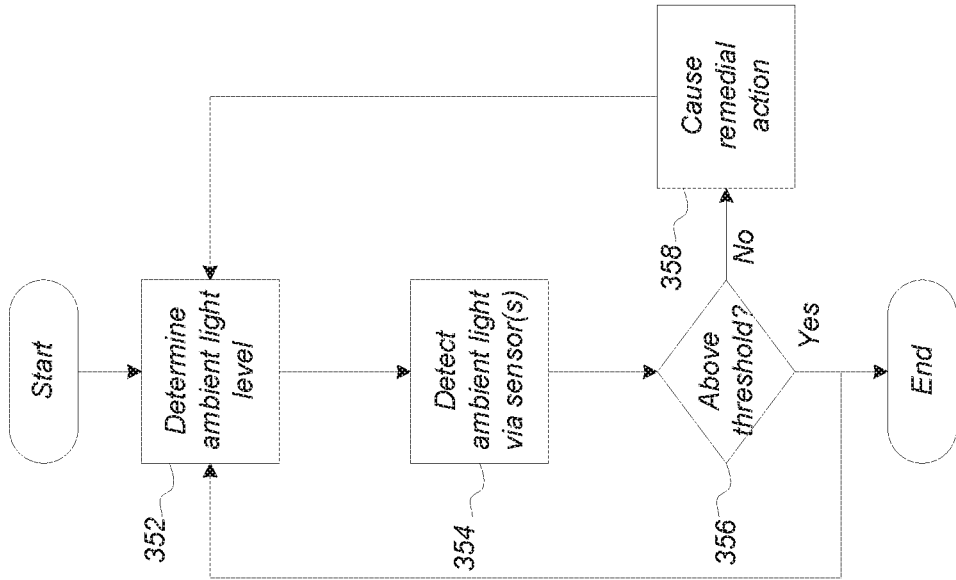
FIGS. 3A/3B illustrate examples of processing flows to perform tampering detection.
Figure 3A:
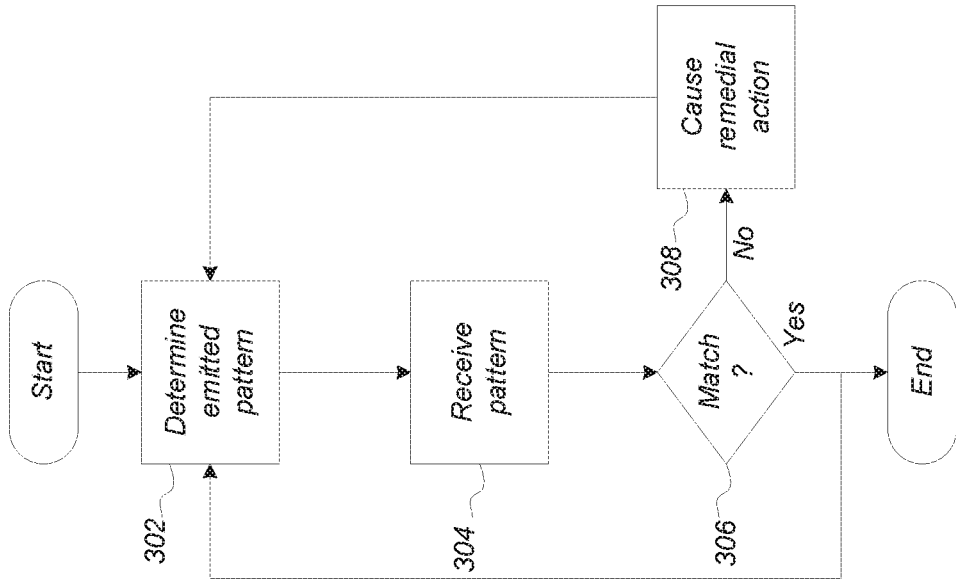

FIGS. 3A/3B illustrate example processing flows 300 and 350 that may be performed by the device detection system 102. For example, one or more processing blocks of FIG. 3A may be performed by the detection controller 110 to perform device detection based on an emitted pattern by one or more light sources that is detected by one or more light detectors. In embodiments, the one or more processing blocks of FIG. 3B may be performed by the detection controller 112 to perform device detection based on ambient light that may be emitted from one or more light sources including a natural light source(s).

In FIG. 3A, the processing flow 300 includes determining a pattern emitted by a light source or caused to be emitted by a light source. For example, the detection controller 112 may receive information from the light controller 110 indicating a caused emitted light pattern. In some embodiments, the information may include an indication of a pattern, an indication of one or more light sources on which the pattern was emitted on, a time emission was caused, and so forth. Embodiments are not limited in this manner.

At block 304, the processing flow 300 includes receiving information indicating a pattern (or non-pattern) detected by one or more light detector(s). As mentioned, the light detector may provide information in the form of electric current or resistance corresponding to light detected by the light detector. In embodiments, the detection controller 112 may determine which light detector is providing the information, e.g., the light detector includes it in the information, based on a signal line connected to the detection controller 112, and so forth.

At block 306, the processing flow 300 includes determining whether the received pattern, one or more of the light detectors, matches the expected or emitted pattern from corresponding light sources. For example, the device detection system 102 may determine an electric current pattern corresponding to the detection and determine whether the received pattern, in the form of a received electric current pattern, matches or not the expected emitted pattern. In this example, the light detector may provide the received pattern in the form a variable electric current. A similar operation may be performed if the light detector provides information in the form of resistance, e.g., a variable resistance pattern may be received and compared to a determined resistance pattern for the caused emitted light. Note that embodiments include determining any number of the light source(s) and/or light detection(s). In some embodiments, a first light source may have a corresponding a first light detector; the detection controller 112 may determine whether the emitted pattern from the first light source matches the detected light pattern from the first light detector. A second light source may have a corresponding second light detection; the detection controller 112 may determine whether the emitted pattern from the second light source matches the detected light pattern from the second light detector. Note that the determination for the first light pattern and light pattern may be performed simultaneously or nearly simultaneously. Embodiments are not limited in this manner.

If at least one of the patterns does not match, the processing flow 300 includes causing a remedial action to be performed at block 308. If the patterns do match, the processing flow 300 may end or may repeat until tampering is detected or an end event is received. Embodiments are limited in this manner.

In FIG. 3B, the processing flow 350 includes determining an ambient light level at block 352. As previously discussed, measurements by one or more light detectors may be utilized to determine the ambient light level. In another example, the device detection system 102 may determine the ambient light level based on a constant output caused by the light controller 110 controlling one or more of the light source(s). Embodiments are not limited in this manner. In some embodiments, the device detection system 102 may not determine the ambient light level prior to performing a detection but may utilize a preset value for the ambient light threshold value.

At block 354, the processing flow 350 includes receiving information indicating an ambient light level detected by one or more light detectors. For example, the detection controller 112 may receive information in the form of electric current or resistance corresponding to light detected by a light detector. In some instances, the information may include additional information, e.g., an identifier of the light detector, the location of the light detector, and so forth.

At block 356, the processing flow 350 includes determining whether the detected ambient light level is (equal to) or greater than the ambient light threshold value. The ambient light threshold value may be a value based on the determined ambient light level at block 352, and/or may be a preset or predetermined value. In embodiments, the device detection system 102 may determine an electric current level received and determined if the received level is equal to or greater than a corresponding electric current level corresponding to the ambient light threshold value. A similar operation may be performed if the light detector provides information in the form of resistance, e.g., a resistance level received may be compared to a determined resistance level for the ambient light threshold value.

If the received light level is less than (or equal to), the processing flow 350 includes causing a remedial action to be performed at block 358. If the received light level is greater than (or equal to) the ambient light threshold value, the processing flow 350 may end or may repeat until tampering is detected or an end event is received. Note that in some embodiments, reverse logic may be utilized, e.g., less than the ambient light threshold value may indicate a higher level of ambient light.

Figure 4:
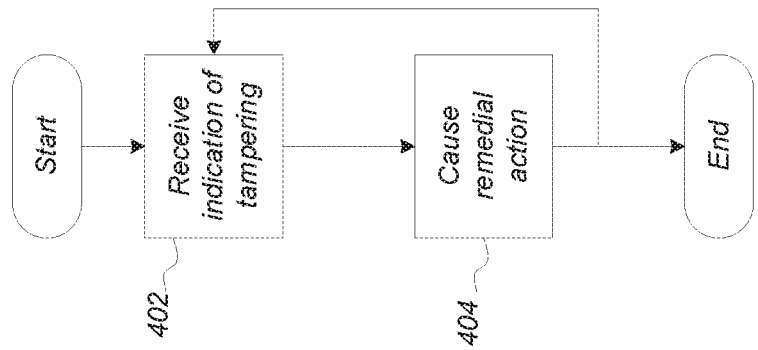
FIG. 4 illustrates an example of a processing flow to perform remedial operations based on detected fraud attempt.

FIG. 4 illustrates an example processing flow 400 to cause a remedial action. In some implementations, one or more processing blocks of FIG. 4 may be performed by the device detection system 102 including the alert controller 114. However, embodiments are not limited in this manner.

In embodiments, the processing flow 400 includes receiving an indication of tampering and/or a device may be placed on and/or near a transaction system at block 402. The indication may be based on a detection determined by the detection controller 112. Further and at block 404, a remedial action may be performed, e.g., such as sending an alert, prohibiting a transaction, and/or generating an alarm (audible and/or visual).

Figure 5A:
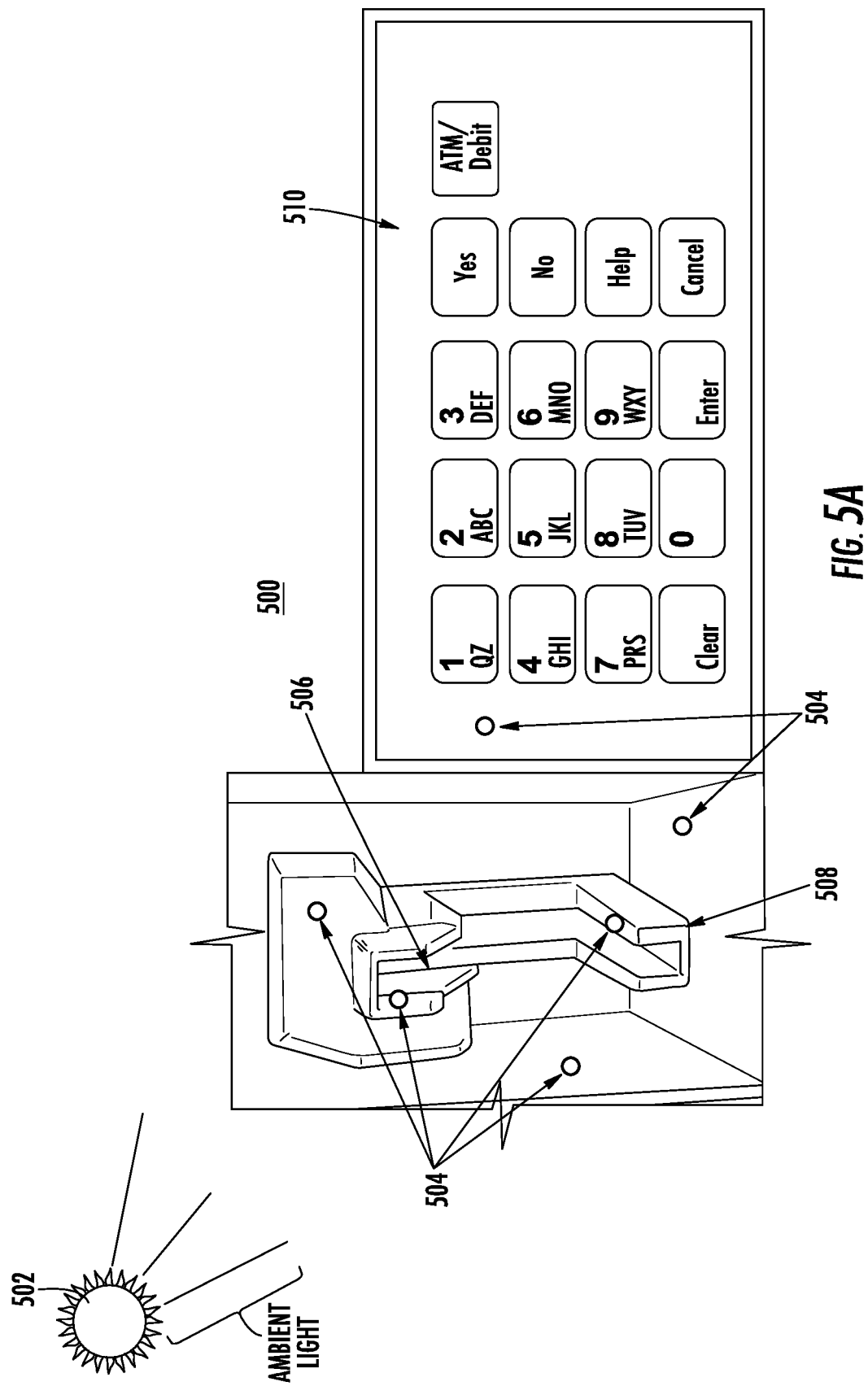
FIGS. 5A-5C illustrate example embodiments of a transaction system.
Figure 5B:
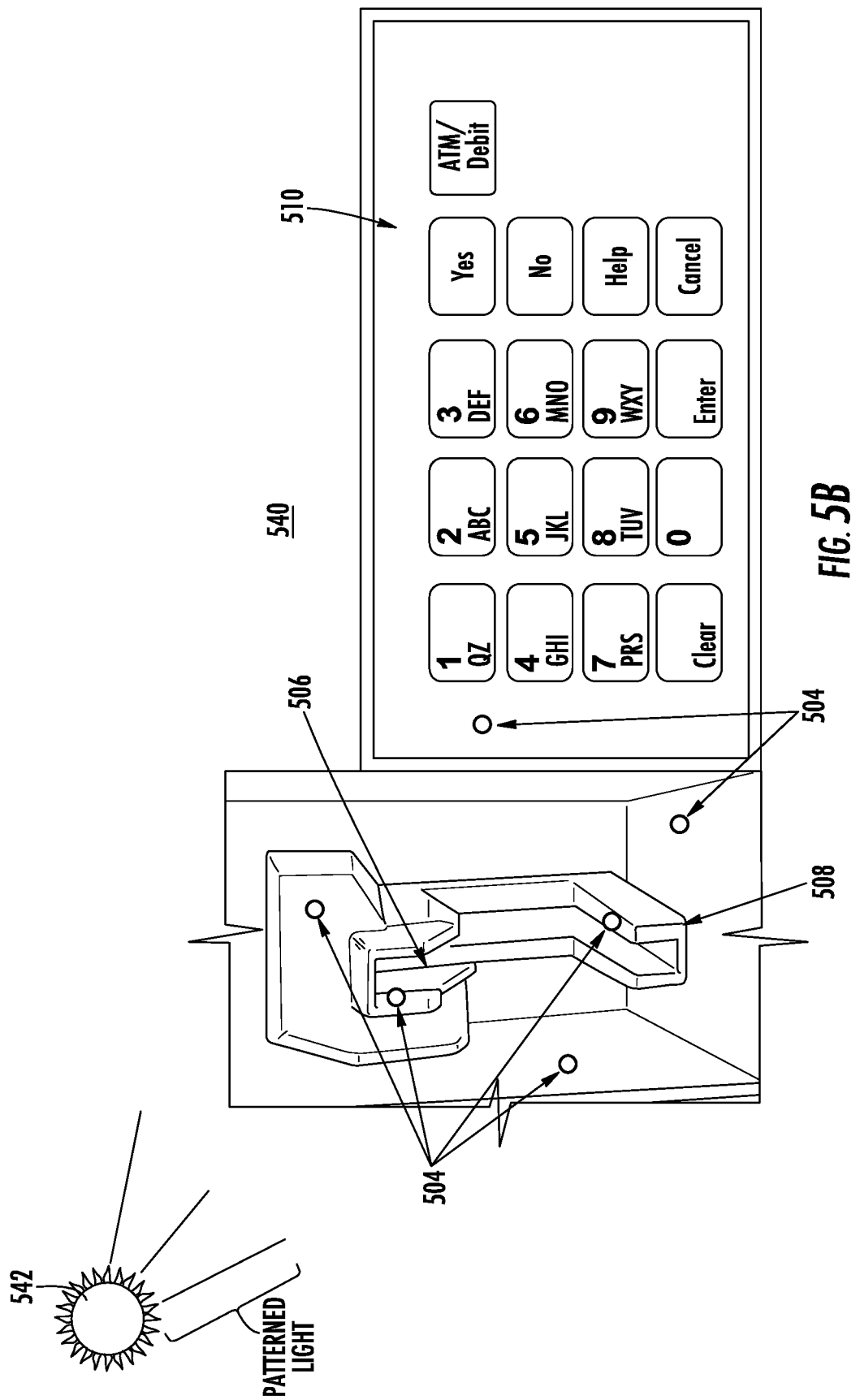
Figure 5C:
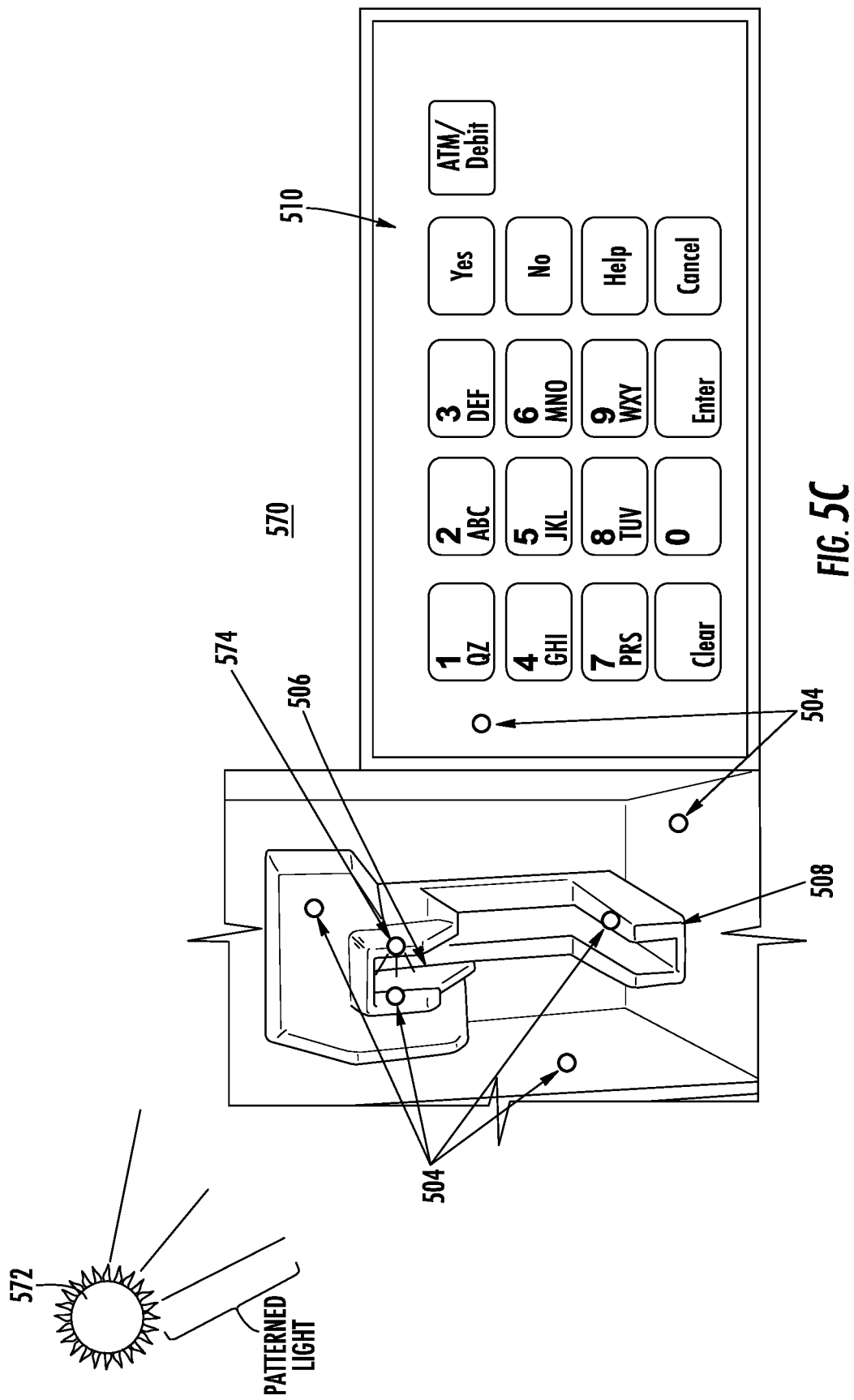

FIGS. 5A-5C illustrate example embodiments of a transaction system 500 that may be utilized to perform a transaction and enabled to detect devices that may be used to perform fraud and/or detect a user's private information. The illustrated example transaction 500 may be part of a larger system to process a transaction at a gas station pump, for example. However, embodiments are not limited in this manner, and the concepts discussed herein may be applied to any type of transaction system including those having POS terminals, ATMs, self-checkout terminals, and so forth.

As illustrated in FIG. 5A, the transaction terminal 500 may include a number of components and devices including a keypad 510, a card reader 506 having a housing 508, a number of light detectors 504, and at least one light source 502. Although not shown, the transaction terminal 500 may include and/or be coupled with the transaction system 100 to perform a fraud detection.

In the illustrated example, the light source 502 may supply ambient light for the area surrounding the transaction system 500. The light source 502 may be any type of light providing a device, e.g., light bulbs, LEDs, etc. In some instances, the light source 502 may be a natural light source, such as the Sun. Further, the light source 502 provides/emits light in any number of light spectrums, as discussed, e.g., visible light, infrared light, ultraviolet light, etc. Embodiments are not limited in this manner.

In embodiments, the ambient light may be detected by one or more light detectors 504, which may be placed in various locations on/in the transaction terminal 500. For example, the light detectors 504 may be located on the keypad 510, the card reader 506, including the housing 508 of the card reader 506, and so forth. In one example, a light detector 504 may be placed on and/or near the housing 508 of the card reader 508 in a location to detect the presence of a card skimmer on the card reader. The location may include a portion of the housing 508 on or near where a user may slide a payment card into the card reader 506, e.g., on a card reader guide, an inner portion of the housing of the card reader 506, and so forth. The location of the light detectors 504 may be chosen to maximize detection of a device placed by a fraudster. Embodiments are not limited in this manner.

FIG. 5B illustrates a similar configuration of the transaction terminal 540 as shown in FIG. 5A. However, in this example, the light source 542 may be capable of emitting random patterns of light. The device detection system 102 via the light controller 110 may control the light source 542 and cause it to emit one or more random patterns of light which may be detected by one or more of the light detectors 504. As discussed, a detection controller 112 coupled with the one or more light detectors 504 may receive information from the light detectors 504 and determine whether the emitted pattern matches the one or more received patterns.

In some instances, as illustrated in FIG. 5C, multiple light sources 572, 574 may be placed on or near the transaction terminal 570. As illustrated in FIG. 5C, a light source 574 may be placed near (or on) a slot associated with the housing 508 of the card reader 506. Thus, a light detector 504 placed near the light source 574 may be utilized to determine whether a correct pattern is emitted by the detection controller 112. Note that the embodiments are not limited to the number and/or the location of light sources and light detectors. They may be strategically located on the transaction terminal 500 to optimally detect tampering devices, e.g., on the keypad 510, on the card reader 506, on the housing 508, and so forth. In one example, a light detector 504 may be placed directly across from the light source 574 on an opposing portion of a gap of the housing 508. In this configuration, any type of tampering device would necessarily conceal and/or break the path of light between the light source 574 and opposing light detector 504. In this example, the light controller 110 may cause the light source 574 to emit a random pattern. The light detector 504 directly across from the light source 574 may or may not detect the random pattern. The detection controller 112 may receive information from the light detector, determine whether a detected pattern matches the emitted pattern, and cause a remedial action if not. Embodiments are not limited to this example.

Note in some embodiments, a combination of detected ambient light levels and detected random patterns may be utilized by the system to determine whether a fraud device is placed on a transaction system. For example, the device detection system 102 may determine whether each of one or more ambient light levels detected by one or more light detectors 504 is above the ambient light threshold level. The device detection system 102 may also process one or more detected random patterns by the light detectors 504 to determine whether they match random patterns emitted by light sources 572 and 574. If the ambient light levels are above the threshold value, and the patterns match, the device detection system 102 determine that no fraud device is detected. However, if one or more of the detected levels is below the threshold level, and/or one of the patterns does not match, the device detection system 102 may determine that a fraud device may be on the transaction system and cause a remedial action. Note that in some embodiments, specific light detectors may be used to detect ambient light levels and others may be used to detected random light patterns. Further, the device detection system 102 may be configured in any number of ways to indicate a detection, e.g., only one detected error may cause a detection, or two or more errors may be needed to cause a detection. The system 102 can be configured to minimize false positives.

FIG. 6A illustrates an example of a processing flow 600 that may be representative of some or all the operations executed by one or more embodiments described herein. For example, the processing flow 600 may illustrate operations performed by a device detection system that may be part of a transaction to detect tampering of the transaction system.

At block 605, the processing flow 600 includes causing a light source to emit a random light pattern. For example, a device detection system may generate a random light pattern and send one or more signals to a light source to cause the light source to emit the generated random light pattern.

In embodiments, the processing flow 600 includes receiving information from a light detector, the information indicating a received light pattern at block 610. At block 615, the processing flow 600 includes determining whether the received light pattern matches the random light pattern, e.g., the light pattern emitted is the same as the light pattern received. If they do not match, the processing flow 600 includes causing a remedial action to be performed at block 620; and if they do match the processing flow 600 includes emit another random light pattern at block 625. Embodiments are not limited in this manner.

FIG. 6B illustrates an example of a processing flow 640 that may be representative of some or all the operations executed by one or more embodiments described herein. For example, the processing flow 640 may illustrate operations performed by a device detection system that may be part of a transaction to detect tampering of the transaction system.

At block 645, the processing flow 640 includes causing the light source to emit a random light pattern. Further, the processing flow 640 includes receiving information from each of the plurality of light detectors, the information indicating received light patterns from each of the plurality of light detectors at block 655.

In embodiments, the processing flow 640 includes determining whether the received light patterns match the random light pattern at block 655. At block 660 and in response to the determination that at least one of the received light patterns do not match the random light pattern, the processing flow 640 includes causing a remedial action to be performed. The processing flow 640, at block 665 includes permitting a transaction terminal (transaction system) to process data in response to the determination that the received light patterns do match the random light pattern.

FIG. 6C illustrates an example of a processing flow 670 that may be representative of some or all the operations executed by one or more embodiments described herein. For example, the processing flow 670 may illustrate operations performed by a device detection system that may be part of a transaction to detect tampering of the transaction system.

At block 675, the processing flow 670 includes causing a light source embedded in a transaction system to emit a random light pattern. At block 680, embodiments including receive information from at least one of a plurality of light detectors, the information indicating one or more received light patterns from the at least one of the plurality of light detectors, and at least one of the plurality of light detectors embedded in a housing of the transaction system, a transaction card reader of the transaction system, and a keypad of the transaction system. At block 685, the processing flow 670 includes determining whether at least one of the one or more received light patterns match the random light pattern.

In response to the determination that the one or more received light patterns do not match the random light pattern, cause a remedial action to be performed at block 690. And in response to the determination that the received light patterns do match the random light pattern, permit the transaction system to process data at block 695.

FIG. 7A illustrates an example of a processing flow 700 that may be representative of some or all the operations executed by one or more embodiments described herein. For example, the processing flow 700 may illustrate operations performed by a device detection system that may be part of a transaction to detect tampering of the transaction system based on ambient light.

At block 705, the processing flow 700 includes receiving information from each of the plurality of light detectors, the information indicating received ambient light levels. The processing flow 700 includes determining whether each of the received ambient light levels is equal to or is below an ambient light threshold value at block 710.

In embodiments, the processing flow 700 includes causing a remedial action in response to the determination that at least one of the received ambient light levels is equal to or below the ambient light threshold value. The processing flow 700, in response to the determination that the received ambient light levels are above the ambient light threshold value, includes permitting a transaction terminal to process transaction data at block 720.

FIG. 7B illustrates an example of a processing flow 730 that may be representative of some or all the operations executed by one or more embodiments described herein. For example, the processing flow 730 may illustrate operations performed by a device detection system that may be part of a transaction to detect tampering of the transaction system based on ambient light.

At block 735, the processing flow 730 includes receiving information from the light detector, the information indicating an ambient light level detected by the light detector. Further, the processing flow 730 includes determining whether the ambient light level above an ambient light threshold value at block 740.

At block 745, in response to the determination that the ambient light level is not above the ambient light threshold value, the processing flow 730 includes causing a remedial action to be performed. Alternatively and in response to the determination that the ambient light level is above the ambient light threshold value, the processing flow 730 includes permitting a transaction to be processed at block 750.

Figure 7C:
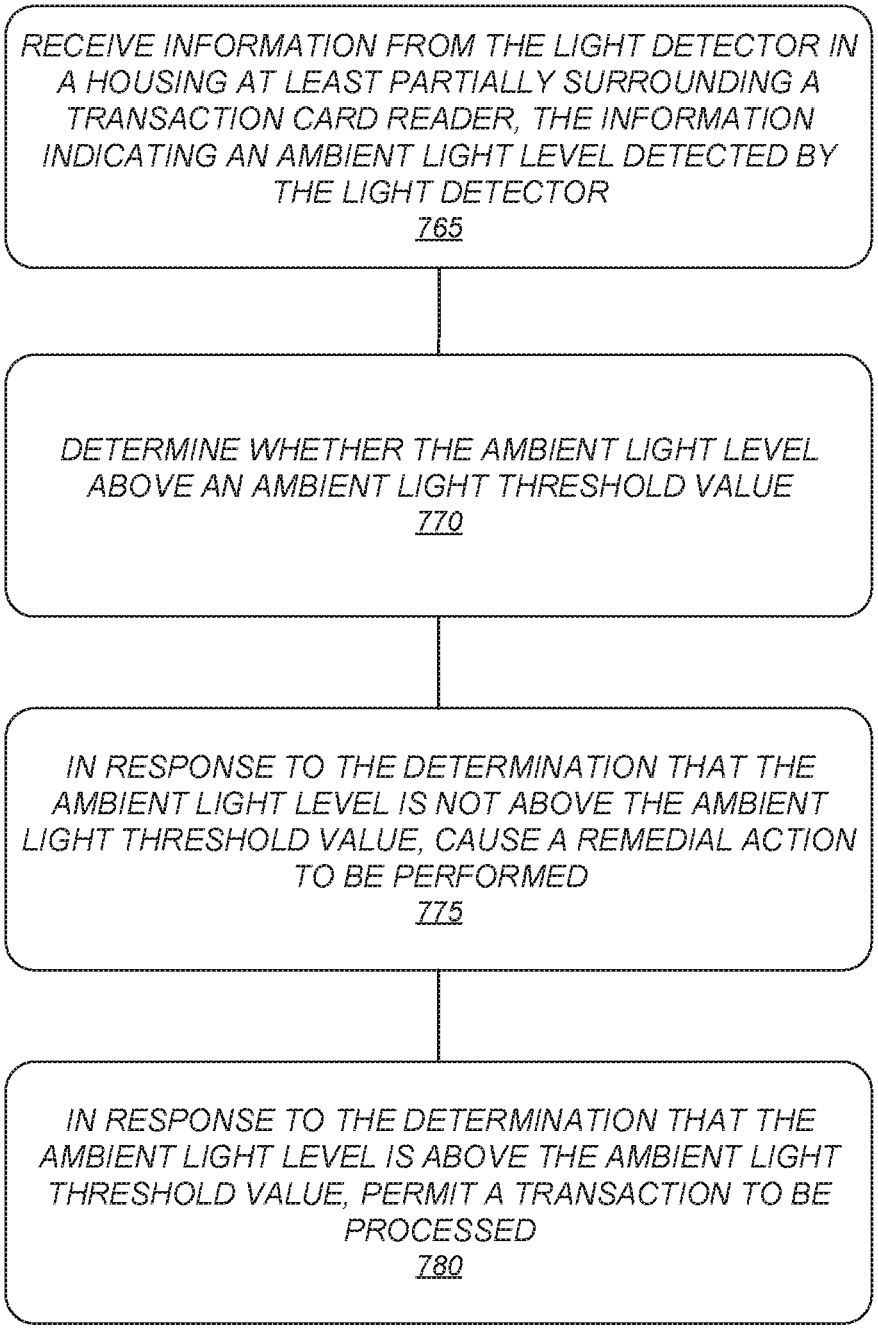

FIG. 7C illustrates an example of a processing flow 760 that may be representative of some or all the operations executed by one or more embodiments described herein. For example, the processing flow 760 may illustrate operations performed by a device detection system that may be part of a transaction to detect tampering of the transaction system based on ambient light.

At block 765, the processing flow 760 includes receiving information from the light detector in a housing at least partially surrounding a transaction card reader, the information indicating an ambient light level detected by the light detector. At block 770, the processing flow 760 includes determining whether the ambient light level above an ambient light threshold value.

At block 775, in response to the determination that the ambient light level is not above the ambient light threshold value, the processing flow 760 includes causing a remedial action to be performed. Further, the processing flow 760, in response to the determination that the ambient light level is above the ambient light threshold value, includes permitting a transaction to be processed at block 780.

Figure 8:
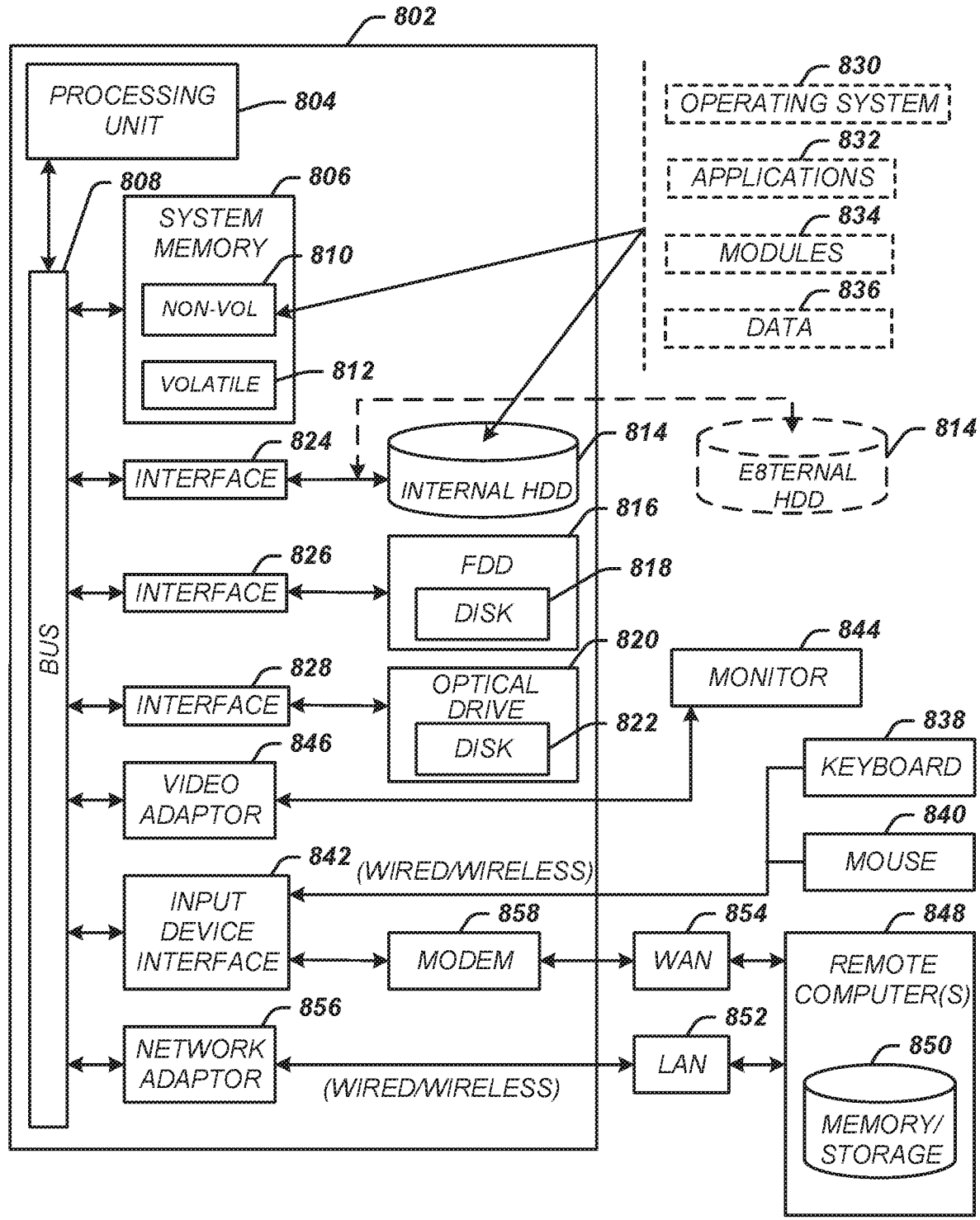
FIG. 8 illustrates an example of a computing architecture.

FIG. 8 illustrates an embodiment of an exemplary computing architecture 800 suitable for implementing various embodiments as previously described. In one embodiment, the computing architecture 800 may include or be implemented as part of system 100.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 700.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808 but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5C may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interface (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 9:
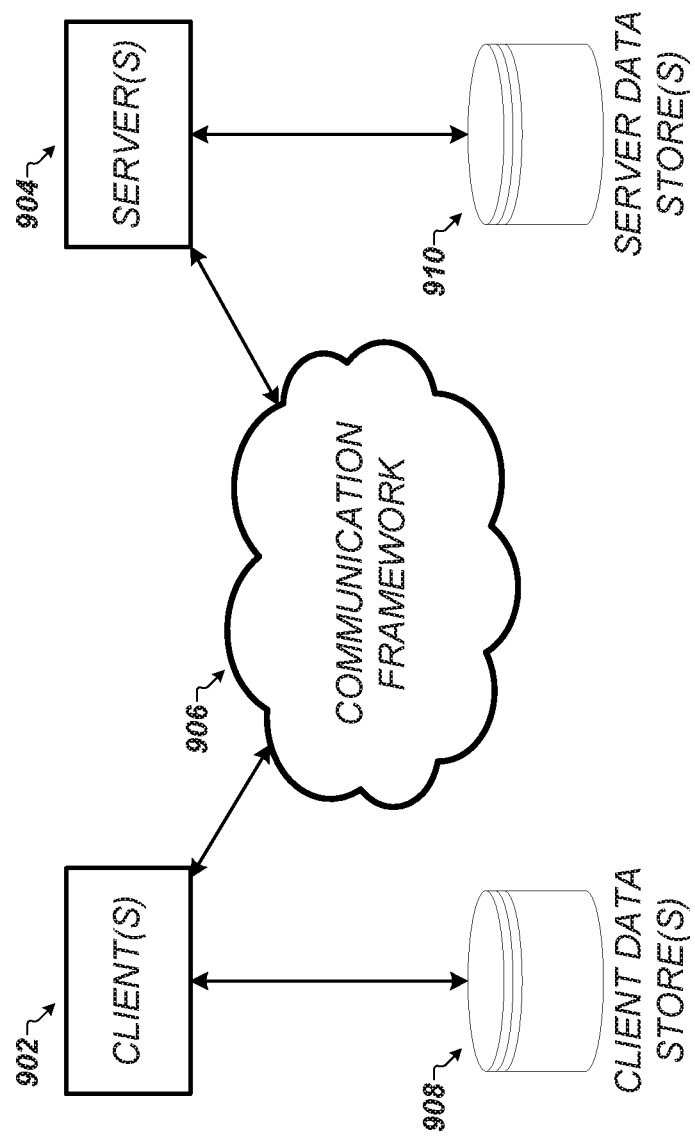
FIG. 9 illustrates an example of a communications architecture.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900, which may be consistent with system 100.

As shown in FIG. 9, the communications architecture 900 includes one or more clients 902 and servers 904. The servers 904 may implement in system 100. The clients 902 and the servers 904 are operatively connected to one or more respective client data stores 906 and server data stores 909 that can be employed to store information local to the respective clients 902 and servers 904, such as cookies and/or associated contextual information.

The clients 902 and the servers 904 may communicate information between each other using a communication framework 910. The communications framework 910 may implement any well-known communications techniques and protocols. The communications framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 902.9a-x network interfaces, IEEE 902.16 network interfaces, IEEE 902.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 10:
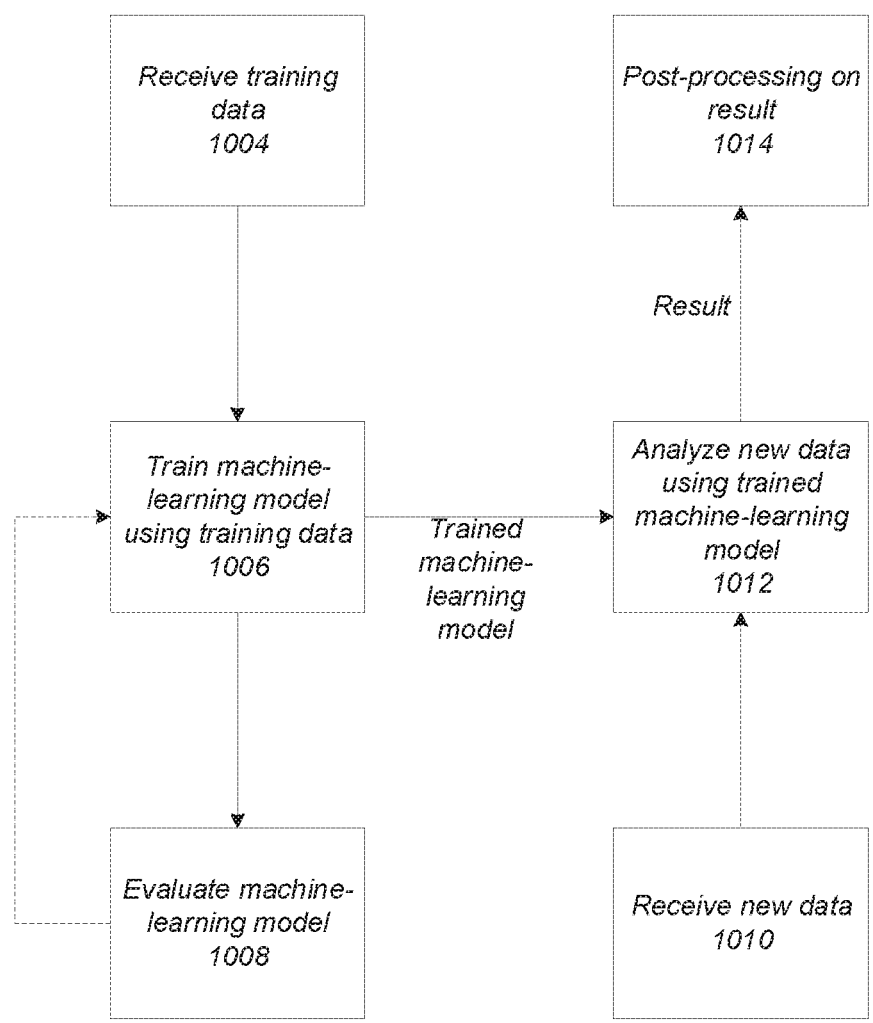
FIG. 10 illustrates an example of a processing flow.

FIG. 10 is a flow chart of an example of a process 1000 for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. In one specific example, the system 100 may utilize machine-learning to determine an ambient light threshold value. An overview of training and using a machine-learning model is described below with respect to the flow chart of FIG. 10.

In block 1004, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data to determine and/or provide context for the text in a video stream. For example, the historical data may include video/text data associated with a particular area or location of a camera. In one specific example, a model may be trained to an ambient light level to utilize an ambient light threshold value for a particular location. The data may include one or more readings from one or more light detectors over a particular amount of time. Embodiments are not limited in this manner.

In block 1006, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 1008, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1006, where the machine-learning model can be further trained using additional training data or otherwise modified to improve accuracy. If the machine-learning model has an adequate degree of accuracy for the particular task, the process can continue to block 1010.

In block 1010, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1012, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1014, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    a housing comprising a light detector;
    a keypad;
    a transaction card reader surrounded by the housing, the transaction card reader comprising a second light detector;
    a light source capable of emitting light patterns;
    a second light source capable of emitting light patterns; and
    a processing circuit coupled with the light source and the light detector, the processing circuit to:
    cause the light source to emit a first random light pattern and the second light source to emit a second random light pattern, wherein the first random light pattern is different than the second random light pattern;
    receive information from the light detector, the information indicating a first received light pattern;
    receive information from the second light detector, the information indicating a second received light pattern detected by the second light detector;
    determine whether the first received light pattern matches the first random light pattern;
    determine whether the second received light pattern matches the second random light pattern;
    in response to the determination that the first received light pattern does not match the first random light pattern or the second received light pattern does not match the second random light pattern, cause a remedial action to be performed; and
    in response to the determination that the first received light pattern does match the first random light pattern and the second received light pattern does match the second random light pattern, emit another random light pattern, and wherein the processing circuit is configured to process a financial transaction based on card data read from a transaction card by the transaction card reader, after a predetermined number of pattern matching determinations are made.

2. The apparatus of claim 1,
    the processing circuit to:
    cause the second light source to emit a third random light pattern;
    receive information from the light detector and/or the second light detector, the information indicating a received third light pattern detected by the light detector and/or the second light detector;
    determine whether the received third light pattern matches the third random light pattern;
    in response to the determination that the received third light pattern does not match the third random light pattern, cause the remedial action to be performed; and
    in response to the determination that the received third light pattern does match the random light pattern, emit another random light pattern.

3. The apparatus of claim 2, wherein the random light pattern, the second random light pattern, and the third random light pattern are different patterns.

4. The apparatus of claim 2, wherein at least two of the random light pattern, the second random light pattern, and the third random light pattern are a same pattern.

5. The apparatus of claim 2, wherein the light source, the second light source, and the third light source to emit random patterns in at least one of a visible light range, an infrared light range, and an ultraviolet light range.

6. The apparatus of claim 1, wherein the remedial action comprises at least one of sending an alert, prohibiting a transaction, and generating an audible and/or visual alarm.

7. The apparatus of claim 1, comprising:
a keypad device comprising a second light detector; and
the processing circuit to:
receive information from the second light detector, the information indicating a received second light pattern by the second light detector;
determine whether the received second light pattern matches the random light pattern;
in response to the determination that the received second light pattern does not match the random light pattern, cause the remedial action to be performed; and
in response to the determination that the received second light pattern does match the random light pattern, emit another random light pattern.

8. The apparatus of claim 7,
the processing circuit to:
cause the second light source to emit a third random light pattern;
receive information from the second light detector, the information indicating a received third light pattern detected by the second light detector;
determine whether the received third light pattern matches the third random light pattern;
in response to the determination that the received third light pattern does not match the third random light pattern, cause the remedial action to be performed; and
in response to the determination that the received third light pattern does match the random light pattern, emit another random light pattern.

9. A system, comprising:
a keypad;
a transaction card reader;
a housing, at least a portion of which surrounds the transaction card reader;
a plurality of light detectors, wherein each of the plurality of light detectors is located on the housing, the keypad, or the transaction card reader;
a light source capable of emitting light patterns;
a second light source capable of emitting light patterns; and
a processing circuit coupled with the light source, the second light source, and the plurality of light detectors, the processing circuit to:
cause the light source to emit a first random light pattern and the second light source to emit a second random light pattern, wherein the first random light pattern is different than the second random light pattern;
receive information from each of the plurality of light detectors, the information indicating received light patterns from each of the plurality of light detectors;
determine whether one of the received light patterns received by a first of the plurality of light detectors match the first random light pattern;
determine whether one of the received light patterns received by a second of the plurality of light detectors match the second random light pattern;
in response to the determination that at least one of the received light patterns does not match the random light pattern, cause a remedial action to be performed; and
in response to the determination that one of the received light patterns does match the first random light pattern and that one of the received light patterns does match the second random light pattern, permit a transaction system to process a financial transaction based on card data read from a card by the transaction card reader.

10. The system of claim 9, wherein the first random light pattern and the second random light pattern are different patterns.

11. The system of claim 9, wherein the first random light pattern and the second random light pattern are a same pattern.

12. The system of claim 9, wherein the second light source to emit the second random pattern in one of a visible light range, an infrared light range, and an ultraviolet light range.

13. The system of claim 9, wherein the remedial action comprises at least one of sending an alert, prohibiting a transaction, and generating an audible and/or visual alarm.

14. A non-transitory computer-readable medium, comprising computer readable code, which when executed by a processor, cause the processor to:
cause a light source embedded in a transaction system to emit a first random light pattern and a second light source embedded in the transaction system to emit a second random light pattern, wherein the first random light is different than the second random light pattern;
receive information from each of a plurality of light detectors, the information indicating one or more received light patterns from each of the plurality of light detectors, and each of the plurality of light detectors being embedded in a housing of the transaction system, a transaction card reader of the transaction system, or a keypad of the transaction system;
determine whether at least one of the one of more received light patterns received by a first of the plurality of light detectors match the first random light pattern;
determine whether at least one of the one or more received light patterns received by a second of the plurality of light detectors match the second random light pattern;
in response to the determination that the one or more received light patterns does not match the first random light pattern or the second random light pattern, cause a remedial action to be performed; and
in response to the determination that one of the one or more received light patterns does match the first random light pattern and one of the one or more received light patterns does match the second random light pattern, permit the transaction system to process a financial transaction based on card data read from a card inserted into a card reader embedded in the transaction system.

15. The computer-readable storage medium of claim 14, further comprising computer-readable program code executable to:
cause a third light source embedded in the transaction system to emit a third random light pattern;
receive information from at least one of the plurality of light detectors, the information indicating third received light patterns from at least one the plurality of light detectors;
determine whether the third received light patterns match the third random light pattern;
in response to the determination that the third received light patterns do not match the third random light pattern, cause a remedial action to be performed; and
in response to the determination that the third received light patterns do match the third random light pattern, permit the transaction system to process data.

16. The computer-readable storage medium of claim 15, wherein the first random light pattern, the second random light pattern, and the third random light pattern are different patterns.

17. The computer-readable storage medium of claim 15, wherein at least two of the random light patterns, the second random light pattern, and the third random light pattern are a same pattern.

* * * * *